(12) United States Patent
Li

(10) Patent No.: US 11,558,154 B2
(45) Date of Patent: Jan. 17, 2023

(54) ESTIMATION APPARATUS, ESTIMATION METHOD, AND NON-TRANSITORY COMPUTER-READABLE RECORDING MEDIUM

(71) Applicant: NEC Corporation, Tokyo (JP)

(72) Inventor: Tansheng Li, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/375,928

(22) Filed: Jul. 14, 2021

(65) Prior Publication Data

US 2022/0060294 A1 Feb. 24, 2022

(30) Foreign Application Priority Data

Aug. 19, 2020 (JP) .............. JP2020-138704

(51) Int. Cl.
*H04L 1/20* (2006.01)
*H04W 28/04* (2009.01)
*H04L 1/16* (2006.01)

(52) U.S. Cl.
CPC ............ *H04L 1/203* (2013.01); *H04L 1/1621* (2013.01); *H04L 1/201* (2013.01); *H04W 28/04* (2013.01)

(58) Field of Classification Search
CPC ..... H04L 1/203; H04L 1/1621; H04L 1/1201; H04W 28/04
See application file for complete search history.

(56) References Cited

U.S. PATENT DOCUMENTS

2012/0082147 A1\* 4/2012 Liu ................ H04L 5/0007
370/338

FOREIGN PATENT DOCUMENTS

JP 6029071 B2 11/2016

\* cited by examiner

*Primary Examiner* — Jamal Javaid

(57) ABSTRACT

In order to appropriately estimate the number of radio frames that fail to be acquired, an estimation apparatus 200 includes: a memory storing instructions; and one or more processors configured to execute the instructions to: acquire a plurality of radio frames transmitted and received through a radio channel; specify key frames, based on time information of the plurality of acquired radio frames; calculate a sum of time lengths of at least a part of the plurality of radio frames being located between two adjacent ones of the key frames; and estimate a number of unacquired radio frames, based on the specified key frames and the calculated sum, the unacquired radio frames being radio frames failing to be acquired.

11 Claims, 13 Drawing Sheets

ESTIMATION APPARATUS, ESTIMATION METHOD, AND NON-TRANSITORY COMPUTER-READABLE RECORDING MEDIUM

BACKGROUND

Technical Field

The present disclosure relates to an estimation apparatus, an estimation method, and a non-transitory computer-readable recording medium.

Background Art

In recent years, radio communication has been in use in various scenes, as a result of ongoing development of radio communication technologies. For example, radio facilities in conformity to the Institute of Electrical and Electronics Engineers (IEEE) 802.11 series have been in wide use.

When a new radio facility is introduced, it is important to evaluate existing radio environments. For example, a radio channel (physical channel) is exclusively used based on medium characteristics, and thus it is preferable to evaluate a degree of congestion of radio (a use rate of a radio channel). This is because there is a tendency that performance (radio performance) of a radio facility that uses the same radio channel as an already used radio channel deteriorates.

A technique of calculating a use rate of a radio channel has been proposed. For example, JP 6029071 B2 (PTL 1) discloses a technique of calculating a channel use rate by measuring time in which a radio channel is used in uplink and downlink radio communications and dividing the channel use time by total measurement time.

PTL 1: JP 6029071 B2

SUMMARY

In the technique of JP 6029071 B2, when all of the transmitted and received radio frames can be acquired, a channel use rate can be calculated with high accuracy. However, generally, it is difficult to acquire all of the radio frames with a capture apparatus such as a radio extension unit. The radio frames that fail to be acquired are not used for calculation of the channel use rate, and thus calculation accuracy of the channel use rate is undesirably deteriorated. In addition, it is clear that a similar problem is also caused regarding other radio parameters that are to be calculated based on the number of radio frames.

In the light of the circumstances as described above, the present disclosure has an example object to provide an estimation apparatus, an estimation method, and a non-transitory computer-readable recording medium that enable estimation of the number of radio frames that fail to be acquired.

An estimation apparatus according to an aspect of the present disclosure includes: a memory storing instructions; and one or more processors configured to execute the instructions to: acquire a plurality of radio frames transmitted and received through a radio channel; specify key frames, based on time information of the plurality of acquired radio frames; calculate a sum of time lengths of at least a part of the plurality of radio frames being located between two adjacent ones of the key frames; and estimate a number of unacquired radio frames, based on the specified key frames and the calculated sum. The unacquired radio frames are radio frames failing to be acquired.

An estimation method according to an aspect of the present disclosure includes the steps of: acquiring a plurality of radio frames transmitted and received through a radio channel; specifying key frames, based on time information of the plurality of acquired radio frames; calculating a sum of time lengths of at least a part of the plurality of radio frames being located between two adjacent ones of the key frames; and estimating a number of unacquired radio frames, based on the specified key frames and the calculated sum. The unacquired radio frames are radio frames failing to be acquired in the acquiring of the plurality of radio frames.

A non-transitory computer-readable recording medium having recorded thereon a program according to an aspect of the present disclosure causes a computer to execute: acquiring a plurality of radio frames transmitted and received through a radio channel; specifying key frames, based on time information of the plurality of acquired radio frames; calculating a sum of time lengths of at least a part of the plurality of radio frames being located between two adjacent ones of the key frames; and estimating a number of unacquired radio frames, based on the specified key frames and the calculated sum, the unacquired radio frames being radio frames failing to be acquired in the acquiring of the plurality of radio frames.

According to the present disclosure, the number of radio frames that fail to be acquired is appropriately estimated. Note that, according to the present disclosure, instead of the above effects or together with the above effects, other effects may be exerted.

DESCRIPTION OF THE EXAMPLE EMBODIMENTS

Figure 1:
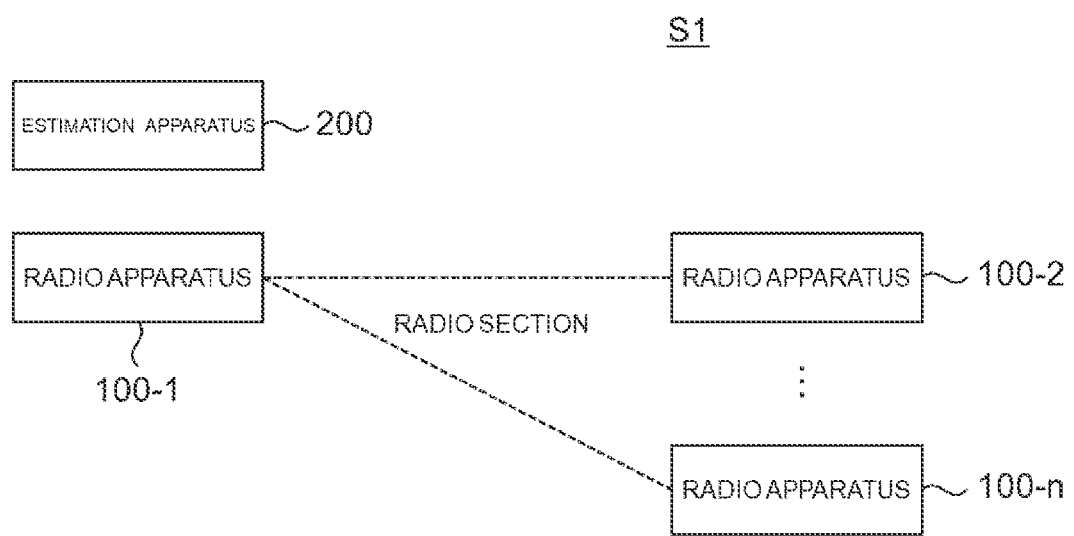
FIG. 1 is an explanatory diagram illustrating an example of a schematic configuration of a communication system S1 according to a first example embodiment of the present disclosure.

Hereinafter, example embodiments of the present disclosure will be described in detail with reference to the accompanying drawings. Note that, in the Specification and drawings, elements to which similar descriptions are applicable are denoted by the same reference signs, and overlapping descriptions may hence be omitted.

Each example embodiment described below is a merely example of configurations for enabling implementation of the present disclosure. Each example embodiment described below can be modified or changed as appropriate according to configurations and various conditions of an apparatus to which the present disclosure is applied. Not necessarily all of the combinations of elements included in each example embodiment described below are essential for implementation of the present disclosure, and a part of the elements can be omitted as appropriate. Thus, the scope of the present disclosure is not limited to the configurations described in each example embodiment described below. Configurations obtained by combining a plurality of configurations described in the example embodiment can also be adopted as far as there is no inconsistency.

The description according to the present disclosure is provided in the following order.

1. Overview of Example Embodiments of Present Invention
2. First Example Embodiment
2.1. Configuration of Communication System S1
2.2. Configuration of Radio Apparatus 100
2.3. Configuration of Estimation Apparatus 200
2.4. Operation Example
2.5. Example Alterations
3. Second Example Embodiment
3.1. Configuration and Operation Example of Communication System S1a and Estimation Apparatus 200a
4. Other Example Embodiments

1. Overview of Example Embodiments of Present Invention

First, an overview of example embodiments of the present disclosure will be described.

(1) Technical Issues

In recent years, radio communication has been in use in various scenes, as a result of ongoing development of radio communication technologies. For example, radio facilities in conformity to the Institute of Electrical and Electronics Engineers (IEEE) 802.11 series have been in wide use.

When a new radio facility is introduced, it is important to evaluate existing radio environments. For example, a radio channel (physical channel) is exclusively used based on medium characteristics, and thus it is preferable to evaluate a degree of congestion of radio (a use rate of a radio channel). This is because there is a tendency that performance (radio performance) of a radio facility that uses the same radio channel as an already used radio channel deteriorates.

In the technique of evaluating the use rate of a radio channel, when all of the transmitted and received radio frames can be acquired, a channel use rate can be calculated with high accuracy. However, generally, it is difficult to acquire all of the radio frames with a capture apparatus such as a radio extension unit. The radio frames that fail to be acquired are not used for calculation of the channel use rate, and thus calculation accuracy of the channel use rate is undesirably deteriorated. In addition, it is clear that a similar problem is also caused regarding other radio parameters that are to be calculated based on the number of radio frames.

In the light of the circumstances as described above, the present example embodiments have an example object to appropriately estimate the number of radio frames that fail to be acquired.

(2) Technical Features

In example embodiments of the present disclosure, an estimation apparatus includes: at least one acquisition section configured to acquire a plurality of radio frames transmitted and received through a radio channel; a specification section configured to specify key frames, based on time information of the plurality of acquired radio frames; a calculation section configured to calculate a sum of time lengths of at least a part of the plurality of radio frames being located between two adjacent ones of the key frames; and an estimation section configured to estimate a number of unacquired radio frames, based on the specified key frames and the calculated sum. The unacquired radio frames are radio frames failing to be acquired by the at least one acquisition section.

According to the configuration described above, the number of radio frames that fail to be acquired is appropriately estimated.

Note that, according to the present example embodiments, instead of the above effects or together with the above effects, other effects may be exerted. Note that the above-described technical features are concrete examples of the example embodiments of the present disclosure, and the present example embodiments of the present disclosure are, of course, not limited to the above-described technical features.

2. First Example Embodiment

Next, with reference to FIG. 1 to FIG. 8, a first example embodiment of the present disclosure will be described.

<<2.1. Configuration of Communication System S1>>

FIG. 1 is an explanatory diagram illustrating an example of a schematic configuration of a communication system S1 according to the present example embodiment. As illustrated in FIG. 1, the communication system S1 according to the present example embodiment includes a plurality of radio apparatuses 100 (100-1 to 100-n (n indicates a natural number)) having a radio communication function and an estimation apparatus 200.

The radio apparatuses 100-1 to 100-n according to the present example embodiment are apparatuses that conform to one or more radio standards. Examples of such radio standards as described above include, but are not limited to, Wi-Fi (trademark), the Institute of Electrical and Electronics Engineers (IEEE) 802.11 series, a radio Local Area Network (LAN), Long Term Evolution (LTE), 5th Generation New Radio (5G NR), and Bluetooth (trademark).

The radio apparatuses 100-1 to 100-$n$ execute data communication in accordance with the radio standard to which the radio apparatuses 100-1 to 100-$n$ conform. The radio apparatuses 100-1 to 100-$n$ according to the present example embodiment can execute radio communication at least in accordance with Wi-Fi.

For example, the radio apparatuses 100 may be an IoT device such as a monitoring camera and a robot, may be a mobile phone terminal such as a smartphone, or may be a communication module mounted on an autonomous car.

The estimation apparatus 200 is an apparatus that executes various processings related to estimation of the radio frames transmitted and received by the radio apparatuses 100-1 to 100-$n$. The estimation apparatus 200 may be installed at any position in the communication system S1. For example, the estimation apparatus 200 may be installed adjacently to the radio apparatus 100, may be installed in a radio section, or may be installed at a position separated away from the radio section.

<<2.2. Configuration of Radio Apparatus 100>>

Figure 2:
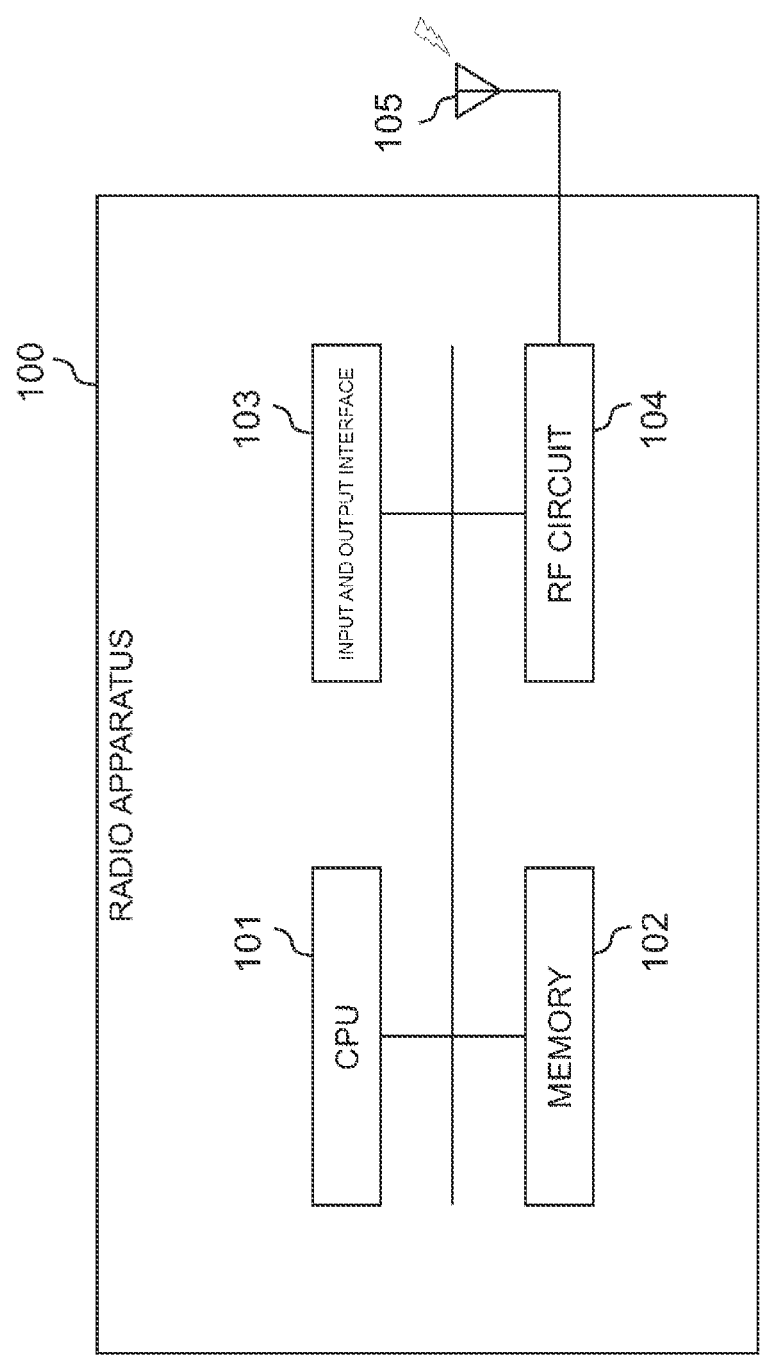
FIG. 2 is a block diagram illustrating an example of a schematic hardware configuration of a radio apparatus 100 according to the first example embodiment of the present disclosure.

FIG. 2 is a block diagram illustrating an example of a schematic hardware configuration of the radio apparatus 100 according to the present example embodiment. As illustrated in FIG. 2, the radio apparatus 100 includes a central processing unit (CPU) 101, a memory 102, an input and output interface 103, a radio frequency (RF) circuit 104, and an antenna 105. The above elements provided in the radio apparatus 100 are connected to each other via an internal bus. Note that the radio apparatus 100 may include hardware elements other than the elements illustrated in FIG. 2.

The CPU 101 is an arithmetic element that implements various functions of the radio apparatus 100. The memory 102 includes a storage medium such as an auxiliary storage apparatus such as a random access memory (RAM), a read only memory (ROM), and a hard disk drive (HDD).

The memory 102 is an element that temporarily or permanently stores a program (command) and data used for executing various processings in the radio apparatus 100. The program includes one or more commands for operation of the radio apparatus 100. The CPU 101 deploys the program stored in the memory 102 to the memory 102 and/or a system memory (not illustrated) to execute the program, and thereby implements the functions of the radio apparatus 100.

The input and output interface 103 is an interface that receives operation for the radio apparatus 100, supplies the received operation to the CPU 101, and presents various pieces of information, an example of which is a touch panel.

The RF circuit 104 is a circuit that executes various signal processings for implementing radio communication. The RF circuit 104 transmits and receives a radio signal to and from other radio apparatuses 100 through the antenna 105.

<<2.3. Configuration of Estimation Apparatus 200>>

Figure 3:
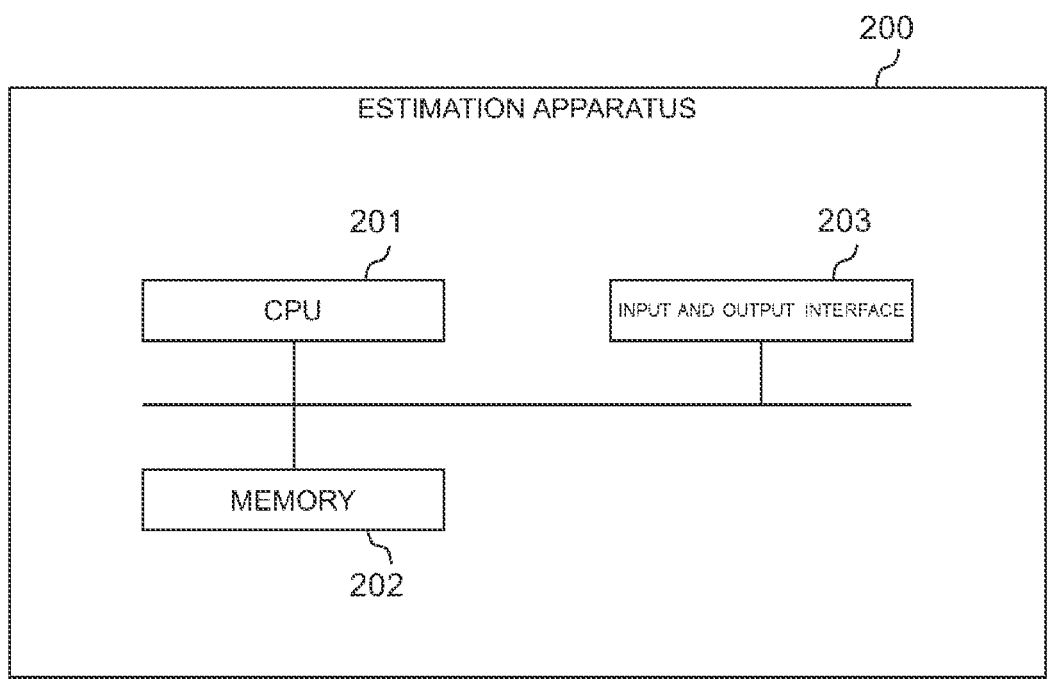
FIG. 3 is a block diagram illustrating an example of a schematic hardware configuration of an estimation apparatus 200 according to the first example embodiment of the present disclosure.

FIG. 3 is a block diagram illustrating an example of a schematic hardware configuration of the estimation apparatus 200 according to the present example embodiment. As illustrated in FIG. 3, the estimation apparatus 200 includes a CPU 201, a memory 202, and an input and output interface 203. The above elements provided in the estimation apparatus 200 are connected to each other via an internal bus. Note that the estimation apparatus 200 may include hardware elements other than the elements illustrated in FIG. 3.

The CPU 201 is an arithmetic element that implements various functions of the estimation apparatus 200. The estimation apparatus 200 may include a plurality of CPUs 201. The memory 202 includes a storage medium such as an auxiliary storage apparatus such as a RAM, a read only memory (ROM), and a hard disk drive (HDD).

The memory 202 is an element that temporarily or permanently stores a program (command) and data used for executing various processings in the estimation apparatus 200. The program includes one or more commands for operation of the estimation apparatus 200. The CPU 201 deploys the program stored in the memory 202 to the memory 202 and/or a system memory (not illustrated) to execute the program, and thereby implements the functions (functional blocks to be described later) of the estimation apparatus 200.

Note that the program stored in the memory 202 may be updated by using update data that is downloaded through a network or update data that is stored in the storage medium.

The input and output interface 203 is an interface that receives operation for the estimation apparatus 200, supplies the received operation to the CPU 201, and presents various pieces of information. The input and output interface 203 may include, for example, an input apparatus such as a mouse and a keyboard, and a display apparatus such as a liquid crystal display.

Figure 4:
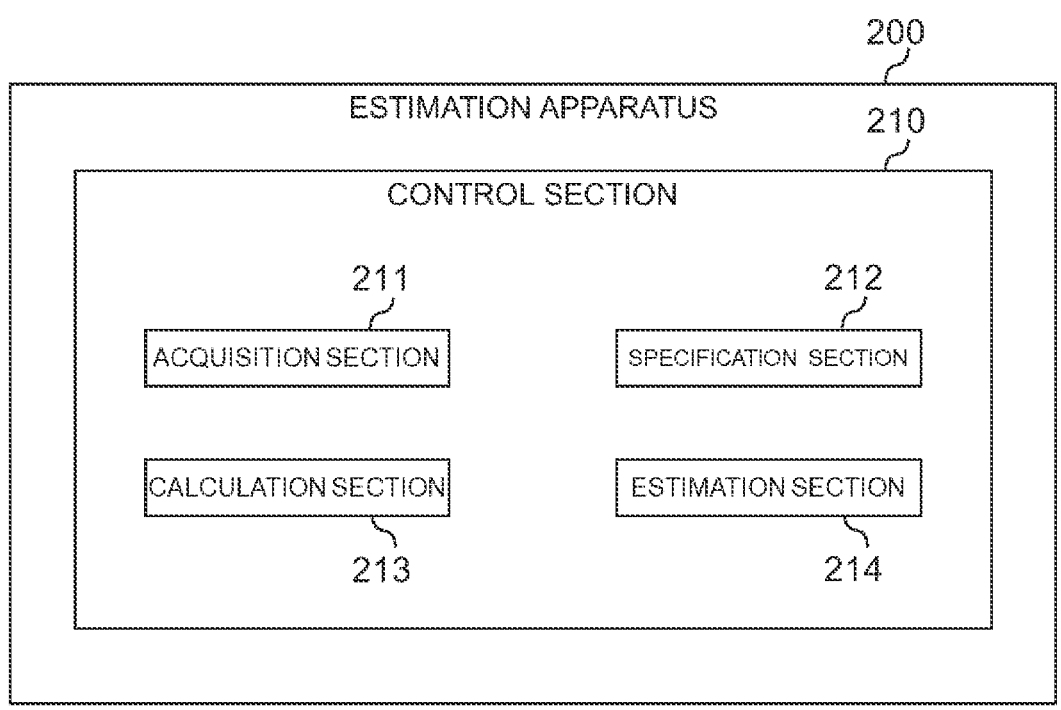
FIG. 4 is a block diagram illustrating an example of a schematic functional configuration of the estimation apparatus 200 according to the first example embodiment of the present disclosure.

FIG. 4 is a block diagram illustrating an example of a schematic functional configuration of the estimation apparatus 200 according to the present example embodiment. As illustrated in FIG. 4, the estimation apparatus 200 includes a control section 210 that includes an acquisition section 211, a specification section 212, a calculation section 213, and an estimation section 214. The control section 210, the acquisition section 211, the specification section 212, the calculation section 213, and the estimation section 214 are each a functional block that is implemented when the CPU 201 executes the program stored in the memory 202 as described above. Note that the control section 210 may further include constituent elements other than the functional blocks described above. In other words, the control section 210 can execute operation other than the operation performed by the functional blocks described above.

The functional blocks described above (the control section 210, the acquisition section 211, the specification section 212, the calculation section 213, and the estimation section 214) may be implemented as hardware by a semiconductor chip. Specifically, functional blocks described above may be implemented by software and the functional blocks may be implemented by hardware.

The acquisition section 211 acquires a plurality of radio frames F transmitted and received through a radio channel. For example, the acquisition section 211 can acquire the radio frames F through a capture apparatus such as a radio extension unit connected to the estimation apparatus 200. Note that a plurality of acquisition sections 211 may be provided in the control section 210 (estimation apparatus 200). Time length of each radio frame F is, for example, 10 milliseconds.

The specification section 212 specifies key frames KF, based on timestamps (time information) of the plurality of radio frames F acquired by the acquisition section 211. For example, the specification section 212 specifies a key frame KF, based on a difference Δ1 of the timestamps between two radio frames F that are adjacent with respect to time. When the above-described difference Δ1 of the timestamps exceeds a threshold Th, the specification section 212 may specify the latter (second) radio frame F as the key frame KF.

The calculation section 213 calculates the time length of the radio frames F (the length of time in which the radio frames F occupy the radio channel). For example, the calculation section 213 calculates the sum of the time lengths of the radio frames F located between two adjacent key frames KF.

The estimation section 214 executes estimation processing related to the radio frames F (unacquired radio frames) that fail to be acquired by the acquisition section 211. For example, the estimation section 214 estimates the number of radio frames F that fail to be acquired by the acquisition section 211.

Note that the estimation apparatus 200 may be virtualized. In other words, the estimation apparatus 200 may be implemented as a virtual machine. In the above case, the estimation apparatus 200 (virtual machine) may operate as a virtual machine in a physical machine (hardware) and a hypervisor including a processor, a memory, and the like.

<<2.4. Operation Example>>

Figure 5:
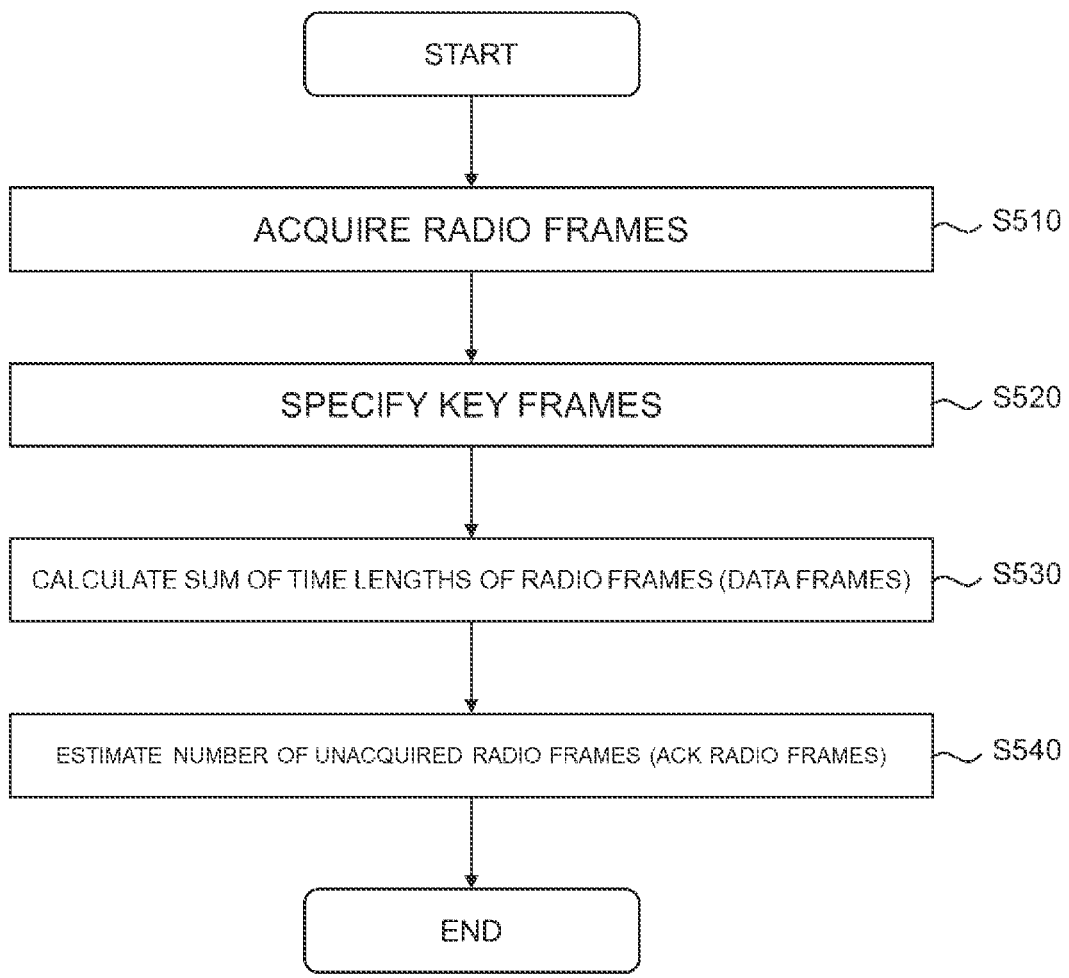
FIG. 5 is a flowchart illustrating an example of estimation processing in the estimation apparatus 200 according to the first example embodiment of the present disclosure.

FIG. 5 is a flowchart illustrating an example of estimation processing in the estimation apparatus 200 according to the present example embodiment.

In Step S510, the acquisition section 211 acquires a plurality of radio frames F transmitted and received through a radio channel. Further details are given below.

The acquisition section 211 captures and acquires radio frames F in a radio channel supplied from a radio extension unit (capture apparatus) that is connected to the estimation apparatus 200 and configured to be a monitor mode. The capture processing may be implemented by a dumpcap command or a tshark command in Linux (trademark), or a wireshark command in Windows (trademark).

The plurality of radio frames F acquired by the acquisition section 211 may also be referred to as a radio frame set. The plurality of radio frames F (radio frame set) described above are data that is stored in the memory 202 or another storage medium and that may be processed by other software or hardware.

The acquisition section 211 supplies the plurality of radio frames F (radio frame set) acquired in Step S510 to the specification section 212.

In Step S520, the specification section 212 specifies the key frames KF, based on the difference Δ1 of the timestamps (time information) between two radio frames F that are adjacent with respect to time. Further details are given below.

The timestamp of the radio frame F in the present example embodiment does not indicate time at which the radio frame F actually occurs. This is because, in the capture apparatus, the captured radio frames F are collectively transferred every predetermined transfer period (for example, 1 millisecond), and are provided timestamps by an operation system (OS) of the estimation apparatus 200.

Figure 6:
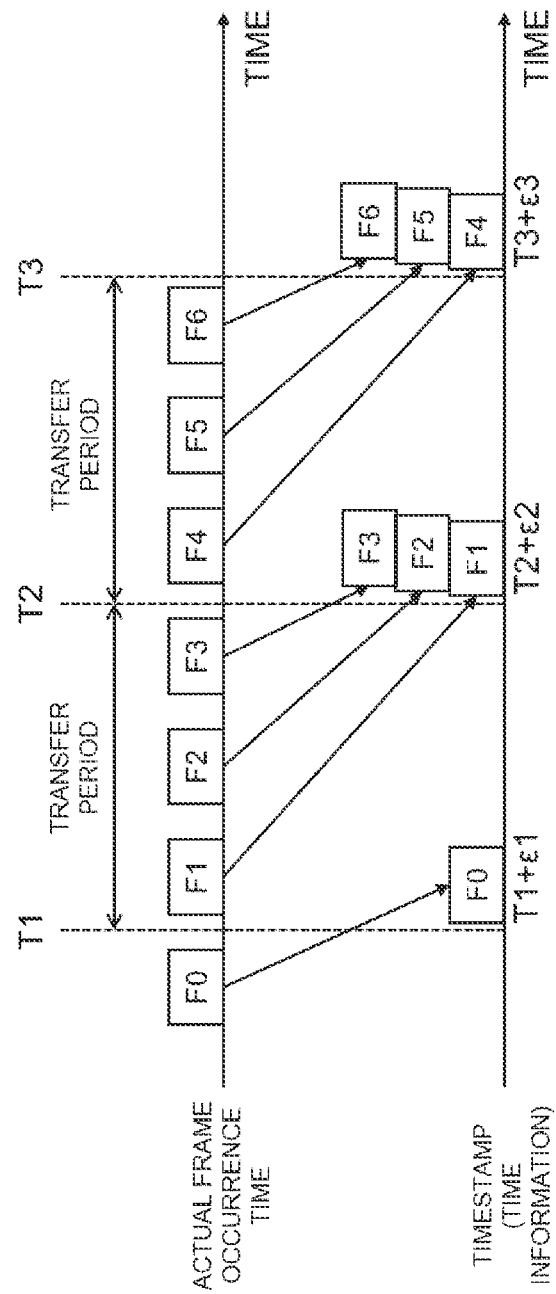
FIG. 6 is an explanatory diagram related to timestamps of radio frames F in the first example embodiment of the present disclosure.

As illustrated in FIG. 6, the timestamps of the radio frames F1, F2, and F3 captured between time T1 and time T2 have time T2 or a value (T2+ε2) very close to time T2. Similarly, the timestamps of the radio frames F4, F5, and F6 captured between time T2 and time T3 have time T3 or a value (T3+ε3) very close to time T3.

For example, the timestamp of the radio frame F1 has time T2, the timestamp of the radio frame F2 has time (T2+ε2), and the timestamp of the radio frame F3 has time (T2+ε2). Here, the value E (E1, E2, . . . ) indicates a value (for example, several microseconds) shorter than the length of the radio frame F.

The specification section 212 specifies, as the key frames KF, the radio frames F (F0, F1, F4, . . . in FIG. 6) that are the closest to the times T1, T2, T3, . . . corresponding to the transfer period, based on the timestamps of the plurality of radio frames F (F1, F2, . . . ) supplied from the acquisition section 211.

More specifically, for example, when the difference Δ1 of the timestamp between two radio frames F that are adjacent with respect to time exceeds a threshold, the specification section 212 specifies the latter (second) radio frame F as the key frame KF, and stores the time T. Note that the threshold may be a value (for example, 500 milliseconds) that is larger than the value E.

In addition, based on the specified key frames KF, the specification section 212 calculates and stores a difference Δ2 of the timestamps between two key frames KF that are adjacent with respect to time (in FIG. 6, a difference between F0 and F1, a difference between F1 and F4, . . . ).

In Step S530, the calculation section 213 calculates the sum of the time lengths of the radio frames F located between two adjacent key frames KF (the length of time in which the radio frames F occupy the radio channel). Further details are given below.

With reference to the example in FIG. 6, the calculation section 213 calculates the sum of the time lengths of the radio frames F1, F2, and F3 located between the time T1 and the time T2. The calculation section 213 may calculate the sum of the time lengths of the radio frames F1, F2, and F3, based on, for example, the number of bits of the radio frames F and a frame transmission rate. Alternatively, the calculation section 213 may measure occupancy time of the radio channel, and thereby calculate the sum of the time lengths of the radio frames F1, F2, and F3. Alternatively, the calculation section 213 may calculate the sum of the time lengths of the radio frames F1, F2, and F3, based on the time lengths included in the radio frames F.

In addition, the calculation section 213 may calculate the sum of the time lengths of data frames D for carrying user data out of the radio frames F.

In Step S540, the estimation section 214 estimates the number of radio frames F that fail to be acquired by the acquisition section 211. It is preferable that the estimation section 214 estimate the number of Acknowledge (ACK) frames (response frames) that fail to be acquired by the acquisition section 211. Further details are given below.

The estimation section 214 compares the difference 42 of the timestamps between two adjacent key frames KF calculated in Step S520 and the sum of the time lengths of the radio frames F located between the two adjacent key frames KF calculated in Step S530. The sum of the time lengths of the radio frames F may be the sum of the time lengths of the data frames (radio frames F for carrying user data).

Figure 7:
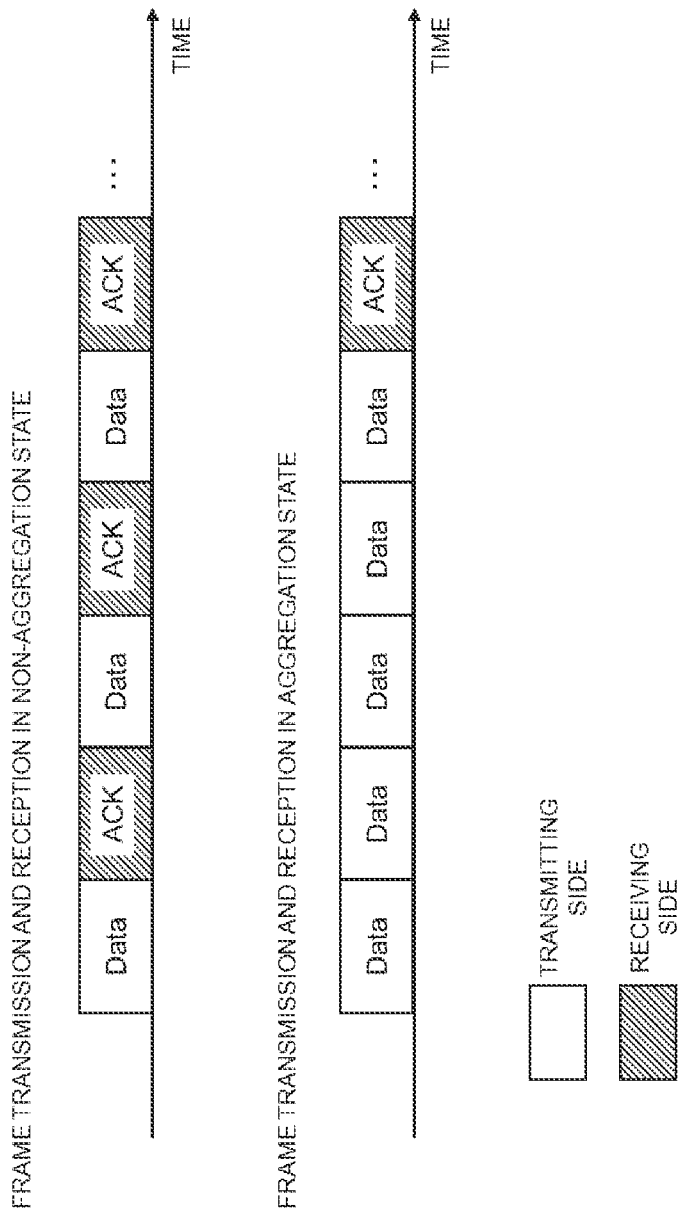
FIG. 7 is an explanatory diagram of a non-aggregation state and an aggregation state in the first example embodiment of the present disclosure.

Next, the estimation section 214 estimates an aggregation state of radio communication, based on results of the above-described comparison. FIG. 7 is an explanatory diagram of a non-aggregation state and an aggregation state in the present example embodiment. Usually, when the radio apparatus 100 on a transmitting side transmits one data frame ("Data" in the figure), the radio apparatus 100 on a receiving side returns one ACK frame ("ACK" in the figure) as a response. Specifically, the data frame and the ACK frame are in a one-to-one relationship. A state in which usual frame transmission and reception as described above is executed is referred to as a "non-aggregation state".

The radio apparatus 100 according to the present example embodiment can execute frame transmission and reception in an "aggregation state" that is different from the above-described "non-aggregation state" in order to save radio resources. In the aggregation state, the radio apparatus 100 on the transmitting side transmits a plurality of data frames ("Data" in the figure), whereas the radio apparatus 100 on the receiving side returns one ACK frame ("ACK" in the figure). Specifically, the data frame and the ACK frame are in a multiple-to-one relationship. In the aggregation state, the number of ACK frames is reduced in comparison to the non-aggregation state, and thus use efficiency of the radio channel is enhanced.

As described above, allocation of the radio frames F is different between the aggregation state and the non-aggregation state. Thus, the estimation section 214 compares the difference 42 of the timestamps between two adjacent key frames KF and the sum of the time lengths of the radio frames F (for example, data frames D) located between the two adjacent key frames KF to estimate the aggregation state of radio communication. Further detailed description will be given below with reference to FIG. 8.

Figure 8:
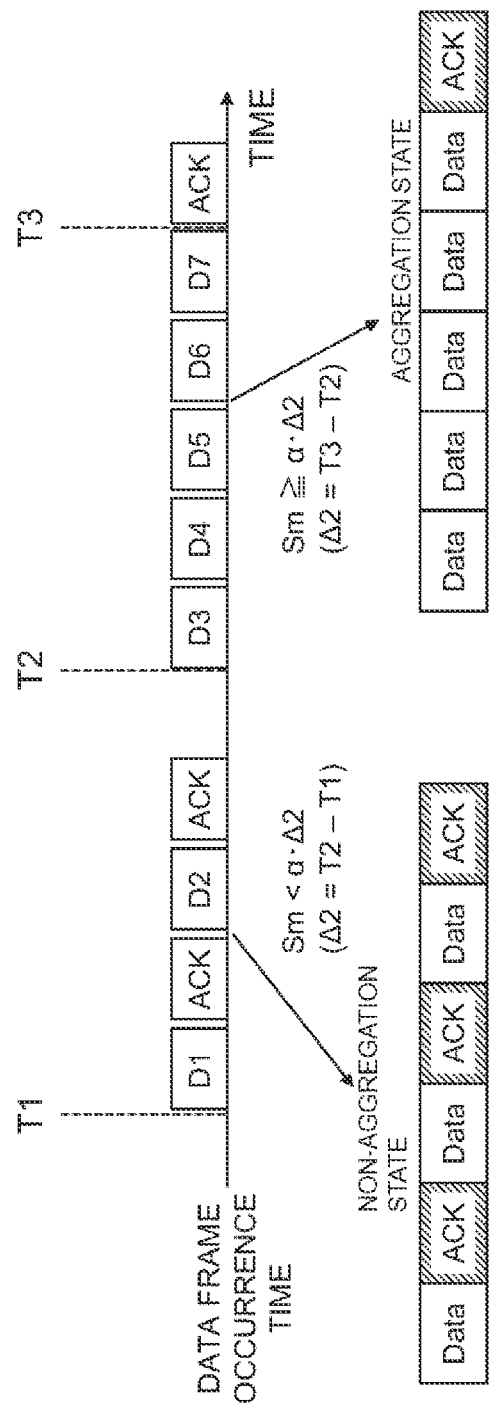
FIG. 8 is an explanatory diagram related to estimation processing of Step S540 in the first example embodiment of the present disclosure.

In FIG. 8, it is assumed that time T1 to time T2 is the non-aggregation state, and time T2 to time T3 is the aggregation state. In the non-aggregation state, the data frames D (D1 and D2) and the ACK frames are alternately transmitted. In contrast, in the aggregation state, the data frames D (D3 to D7) are continuously transmitted.

When the sum Sm of the time lengths of the data frames D located between two adjacent key frames KF is less than a value obtained by multiplying the difference $\Delta 2$ of the timestamps between the two adjacent key frames KF by a predetermined coefficient $\alpha$ ($0<\alpha \leq 1$) (Sm$<\alpha \cdot \Delta 2$), the estimation section 214 estimates that the state is the non-aggregation state. In the example of FIG. 8, the estimation section 214 estimates that a period ($\Delta 2=T2-T1$) from time T1 to time T2 is the non-aggregation state.

As described above, in the non-aggregation state, the data frame D and the ACK frame are in a one-to-one relationship. Thus, the estimation section 214 estimates that the number of ACK frames is the same as the number of data frames D.

When the sum Sm of the time lengths of the data frames D located between two adjacent key frames KF is equal to or greater than the value obtained by multiplying the difference $\Delta 2$ of the timestamps between the two adjacent key frames KF by the predetermined coefficient $\alpha$ (Sm$\geq \alpha \cdot \Delta 2$), the estimation section 214 estimates that the state is the aggregation state. In the example of FIG. 8, the estimation section 214 estimates that a period ($\Delta 2=T3-T2$) from time T2 to time T3 is the aggregation state.

As described above, in the aggregation state, the data frame D and the ACK frame are in a multiple-to-one relationship. Thus, the estimation section 214 estimates that the number of ACK frames is less than the number of data frames D, and that there are no ACK frames that fail to be acquired other than the ACK frames acquired by the acquisition section 211.

According to the configuration of the present example embodiment described above, the number of radio frames F that fail to be acquired is appropriately estimated. More specifically, the number of ACK frames difficult to be acquired in general can be estimated, based on whether radio communication executed by the radio apparatus 100 is the non-aggregation state or the aggregation state.

<<2.5. Example Alterations>>

The present example embodiment described above may be altered in various forms. Examples of specific aspects of alterations are illustrated below. Any of two or more aspects that are selected from the example embodiment described above and the examples illustrated below can be combined as appropriate as far as there is no inconsistency.

Figure 9:
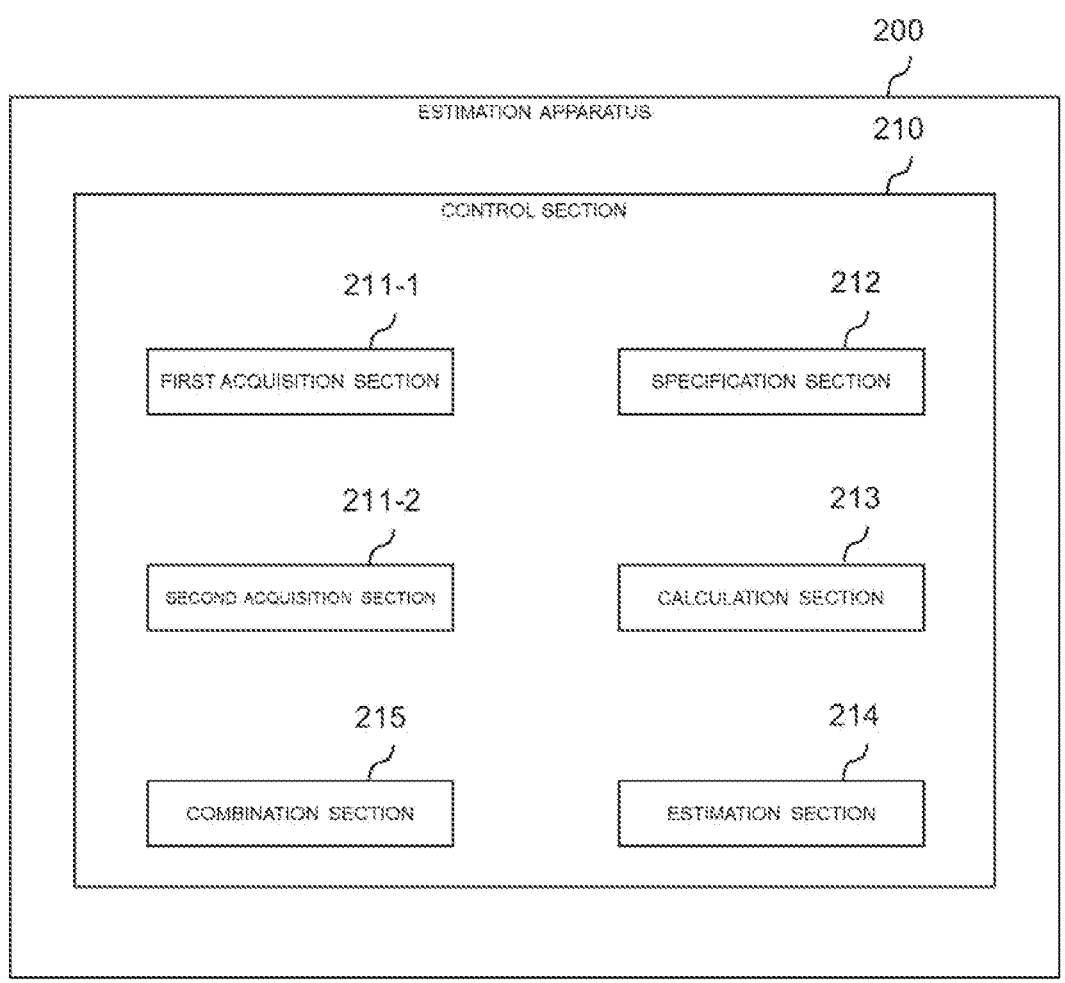
FIG. 9 is a block diagram illustrating an example of a schematic functional configuration of an estimation apparatus 200 according to an example alteration of the first example embodiment of the present disclosure.

FIG. 9 is a block diagram illustrating an example of a schematic functional configuration of an estimation apparatus 200 according to an example alteration of the present example embodiment. The estimation apparatus 200 according to the present example alteration includes a first acquisition section 211-1, a second acquisition section 211-2, and a combination section 215. Other configurations are similar to those of the first example embodiment described above. Note that the estimation apparatus 200 according to the present example alteration may include three or more acquisition sections 211-1, 211-2, 211-3, . . . .

Figure 10:
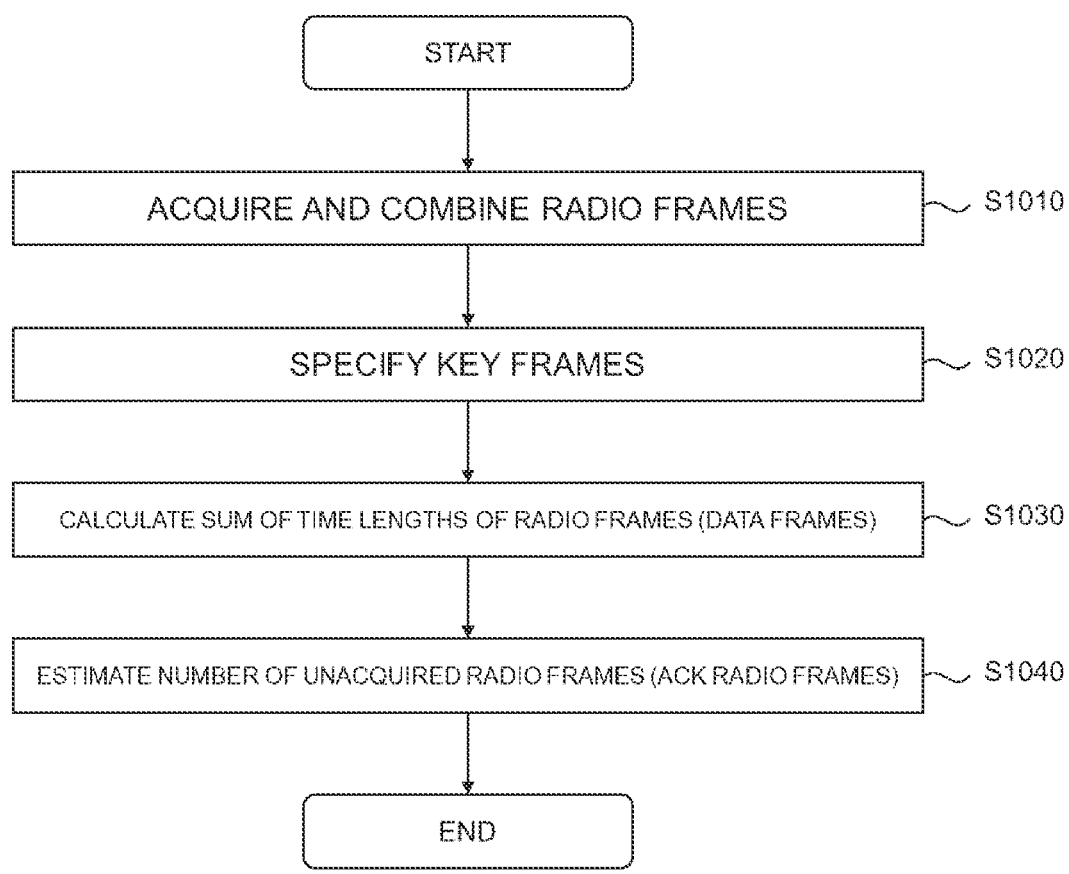
FIG. 10 is a flowchart illustrating an example of estimation processing in the estimation apparatus 200 according to the example alteration of the first example embodiment of the present disclosure.

FIG. 10 is a flowchart illustrating an example of estimation processing in the estimation apparatus 200 according to the example alteration of the present example embodiment.

In Step S1010, each of the first acquisition section 211-1 and the second acquisition section 211-2 acquires a plurality of radio frames F transmitted and received through a radio channel. A specific acquisition method is similar to that in the operation performed by the acquisition section 211 in the first example embodiment.

Next, the combination section 215 executes combination processing of combining a plurality of radio frames F (first radio frame set) acquired by the first acquisition section 211-1 and a plurality of radio frames F (second radio frame set) acquired by the second acquisition section 211-2. Note that any of the acquisition sections 211-1 and 211-2 may execute the present processing. Further details are given below.

Figure 11:
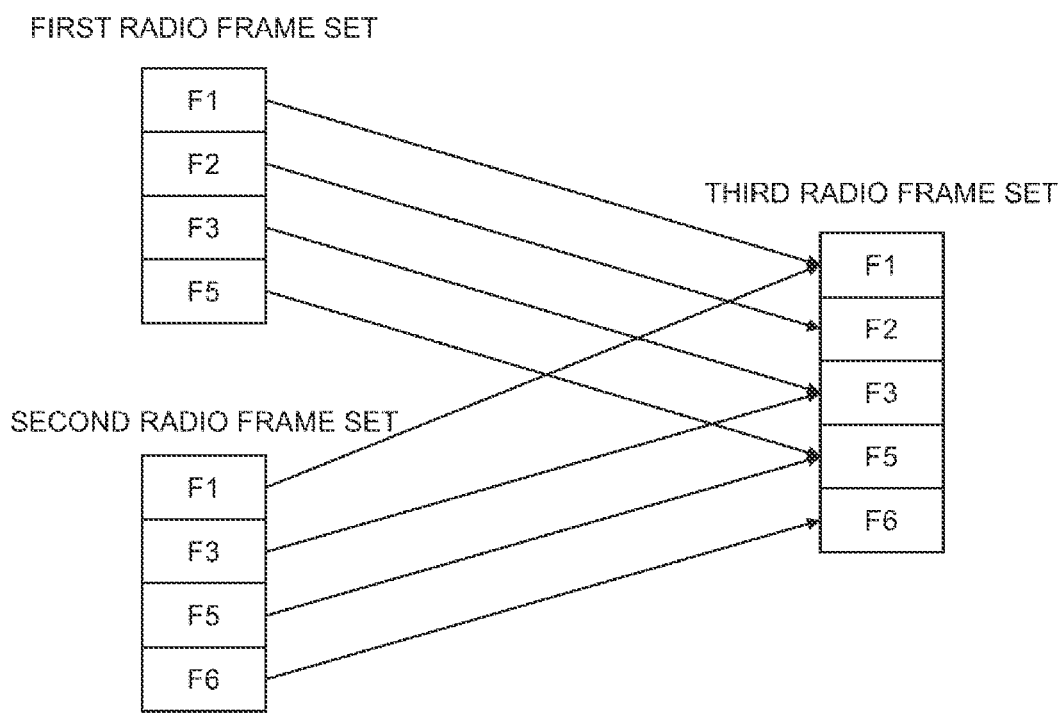
FIG. 11 is an explanatory diagram of radio frame sets according to the example alteration of the first example embodiment of the present disclosure.

As illustrated in FIG. 11, the combination section 215 obtains the sum of sets of the first radio frame set and the second radio frame set, and thereby implements the combination processing described above. Through the combination processing described above, a third radio frame set (the sum of the sets) is formed.

In the example of FIG. 11, the first radio frame set includes radio frames F1, F2, F3, and F5, and the second radio frame set includes radio frames F1, F3, F5, and F6. Each radio frame F is identified based on identification information such as a timestamp and a sequence number. As the identification information, a part of the contents of the radio frame F and a character string derived from all or a part of the radio frame F may be used. For example, a hash function of the radio frame F may be used as the identification information.

The combination section 215 includes the radio frames F included in the first radio frame set and the second radio frame set in the third radio frame set such that the radio frames do not overlap. In the example of FIG. 11, the third radio frame set is formed so that regarding each of the radio frames F1, F3, and F5, which overlap in the first radio frame set and the second radio frame set, only one radio frame is included.

The combination section 215 supplies the third radio frame set obtained through the combination processing to the specification section 212. In the following Step S1020 to S1040, processing similar to Steps S520 to S540 described with reference to FIG. 5 is executed for the third radio frame set described above.

According to the configuration described above, technical effects similar to those of the first example embodiment (FIG. 5 and other figures) are exerted. In addition, a larger number of a plurality of radio frames F can be acquired owing to the plurality of acquisition sections 211-1 and 211-2, and thus estimation accuracy can be further enhanced.

3. Second Example Embodiment

Next, with reference to FIG. 12 and FIG. 13, a second example embodiment of the present disclosure will be described. The first example embodiment described above is a specific example embodiment, whereas the second example embodiment is a more generalized example embodiment. According to the second example embodiment described below, technical effects similar to those of the first example embodiment are exerted.

<<3.1. Configuration and Operation Example of Communication System S1a and Estimation Apparatus 200a>>

Figure 12:
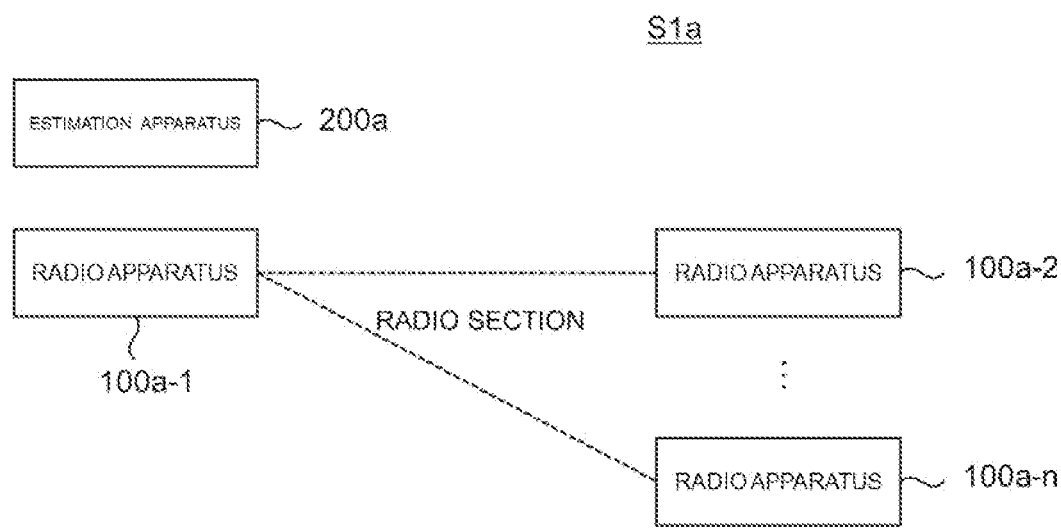
FIG. 12 is a block diagram illustrating an example of a schematic configuration of a communication system S1a according to a second example embodiment of the present disclosure.

FIG. 12 is a block diagram illustrating an example of a schematic configuration of a communication system S1a according to the second example embodiment of the present disclosure. The communication system S1a includes a plurality of radio apparatuses 100a (100a-1, 100a-2, . . . , 100a-n) that transmit and receive a plurality of radio frames through a radio channel, and an estimation apparatus 200a.

Figure 13:
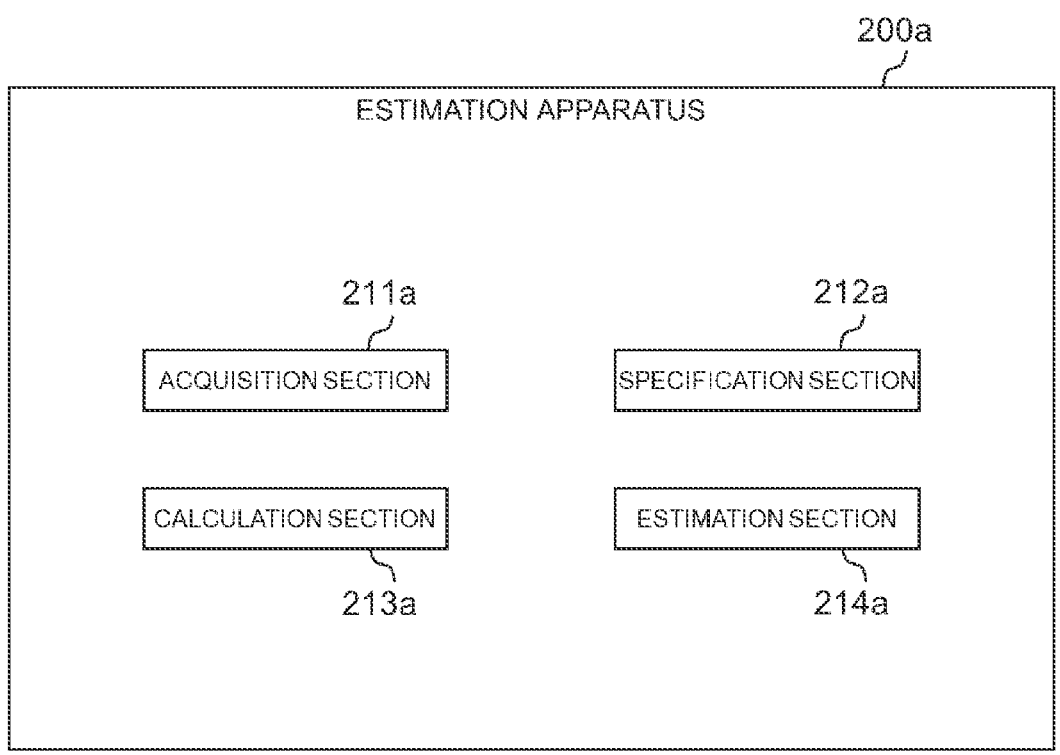
FIG. 13 is a block diagram illustrating an example of a schematic configuration of an estimation apparatus 200a according to the second example embodiment of the present disclosure.

FIG. 13 is a block diagram illustrating an example of a schematic configuration of the estimation apparatus 200a according to the second example embodiment of the present disclosure. The estimation apparatus 200a includes at least one acquisition section 211a, a specification section 212a, a calculation section 213a, and an estimation section 214a.

The acquisition section 211a acquires a plurality of radio frames transmitted and received through a radio channel. The specification section 212a specifies key frames, based on time information of the plurality of acquired radio frames. The calculation section 213a calculates the sum of the time lengths of at least a part of radio frames located between two adjacent key frames. The estimation section 214a estimates the number of unacquired radio frames being radio frames that fail to be acquired by the acquisition section, based on the specified key frames and the calculated sum.

Relationship with First Example Embodiment

As an example, the estimation apparatus 200a according to the second example embodiment may execute the operation of the estimation apparatus 200 according to the first example embodiment. Similarly, as an example, the communication system S1a according to the second example embodiment may be configured similarly to the communication system S1 according to the first example embodiment. In the above case, description regarding the first example embodiment can also be applied to the second example embodiment. Note that the second example embodiment is not limited to the above examples.

4. Other Example Embodiments

Descriptions have been given above of the example embodiments of the present disclosure. However, the present disclosure is not limited to these example embodiments. It should be understood by those of ordinary skill in the art that these example embodiments are merely examples and that various alterations are possible without departing from the scope and the spirit of the present disclosure.

For example, the steps in the processing described in the Specification may not necessarily be carried out in time series in the order described in the flowcharts. For example, the steps in the processing may be carried out in order different from that described in the flowcharts or may be carried out in parallel. Some of the steps in the processing may be deleted, or more steps may be added to the processing.

An apparatus (for example, one or more apparatuses (or sections) out of a plurality of apparatuses (or sections) constituting any one of the above entities, or a module for one of the plurality of apparatuses (or sections)) that includes constituent elements (for example, the acquisition section, the specification section, the calculation section, the estimation section, and/or the combination section) of the radio apparatus and the estimation apparatus described in the Specification may be provided.

Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present disclosure.

The whole or part of the example embodiments disclosed above can be described as, but not limited to, the following supplementary notes.

(Supplementary Note 1)

An estimation apparatus comprising: at least one acquisition section configured to acquire a plurality of radio frames transmitted and received through a radio channel; a specification section configured to specify key frames, based on time information of the plurality of acquired radio frames; a calculation section configured to calculate a sum of time lengths of at least a part of the plurality of radio frames being located between two adjacent ones of the key frames; and an estimation section configured to estimate a number of unacquired radio frames, based on the specified key frames and the calculated sum, the unacquired radio frames being radio frames failing to be acquired by the at least one acquisition section.

(Supplementary Note 2)

The estimation apparatus according to Supplementary Note 1, wherein the specification section is configured to, when a difference of time information between two of the plurality of radio frames being adjacent with respect to time exceeds a threshold, specify a latter one of the two of the plurality of radio frames as one of the key frames.

(Supplementary Note 3)

The estimation apparatus according to Supplementary Note 1 or 2, wherein the estimation section is configured to estimate the number of unacquired radio frames, based on comparison results obtained by comparing a difference of the time information between the two adjacent ones of the key frames and the sum.

(Supplementary Note 4)

The estimation apparatus according to any one of Supplementary Notes 1 to 3, wherein the calculation section is configured to calculate a sum of time lengths of data frames located between the two adjacent ones of the key frames as the sum of the time lengths of the at least the part of the plurality of radio frames being located between the two adjacent ones of the key frames.

(Supplementary Note 5)

The estimation apparatus according to Supplementary Note 4, wherein the number of unacquired radio frames estimated by the estimation section is a number of ACK frames transmitted as a response for the data frames.

(Supplementary Note 6)

The estimation apparatus according to Supplementary Note 4 or 5, wherein the estimation section is configured to estimate that the number of unacquired radio frames is equal to a number of the data frames being located between the two adjacent ones of the key frames.

(Supplementary Note 7)

The estimation apparatus according to any one of Supplementary Notes 1 to 6, wherein the at least one acquisition section includes a plurality of acquisition sections, and the estimation apparatus further comprises a combination section configured to provide a radio frame set combining the plurality of radio frames acquired by the plurality of acquisition sections for specification processing performed by the specification section.

(Supplementary Note 8)

The estimation apparatus according to any one of Supplementary Notes 1 to 7, wherein the acquisition section is configured to acquire, by capturing, the plurality of radio frames in the radio channel supplied from a capture apparatus configured to be a monitor mode.

(Supplementary Note 9)

The estimation apparatus according to any one of Supplementary Notes 1 to 8, wherein the calculation section is configured to calculate the sum of the time lengths of the plurality of radio frames, based on a number of bits of the plurality of radio frames and a frame transmission rate, or by measuring occupancy time of the radio channel.

(Supplementary Note 10)

The estimation apparatus according to any one of Supplementary Notes 1 to 9, wherein the estimation section is configured to estimate the number of unacquired radio frames, based on an aggregation state estimated according to the specified key frames and the calculated sum.

(Supplementary Note 11)

A communication system comprising: a plurality of radio apparatuses configured to transmit and receive a plurality of radio frames through a radio channel; and an estimation apparatus, wherein the estimation apparatus includes at least one acquisition section configured to acquire the plurality of radio frames, a specification section configured to specify key frames, based on time information of the plurality of acquired radio frames, a calculation section configured to calculate a sum of time lengths of at least a part of the plurality of radio frames being located between two adjacent ones of the key frames, and an estimation section configured to estimate a number of unacquired radio frames, based on the specified key frames and the calculated sum, the unacquired radio frames being radio frames failing to be acquired by the at least one acquisition section.

(Supplementary Note 12)

An estimation method comprising the steps of: acquiring a plurality of radio frames transmitted and received through a radio channel; specifying key frames, based on time information of the plurality of acquired radio frames; calculating a sum of time lengths of at least a part of the plurality of radio frames being located between two adjacent ones of the key frames; and estimating a number of unacquired radio frames, based on the specified key frames and the calculated sum, the unacquired radio frames being radio frames failing to be acquired in the acquiring of the plurality of radio frames.

(Supplementary Note 13)

A program causing a computer to execute: acquiring a plurality of radio frames transmitted and received through a radio channel; specifying key frames, based on time information of the plurality of acquired radio frames; calculating a sum of time lengths of at least a part of the plurality of radio frames being located between two adjacent ones of the key frames; and estimating a number of unacquired radio frames, based on the specified key frames and the calculated sum, the unacquired radio frames being radio frames failing to be acquired in the acquiring of the plurality of radio frames.

(Supplementary Note 14)

A non-transitory computer-readable recording medium having recorded thereon a program causing a computer to execute: acquiring a plurality of radio frames transmitted and received through a radio channel; specifying key frames, based on time information of the plurality of acquired radio frames; calculating a sum of time lengths of at least a part of the plurality of radio frames being located between two adjacent ones of the key frames; and estimating a number of unacquired radio frames, based on the specified key frames and the calculated sum, the unacquired radio frames being radio frames failing to be acquired in the acquiring of the plurality of radio frames.

This application claims priority based on Japanese Patent Application No. 2020-138704 filed on Aug. 19, 2020, the entire disclosure of which is incorporated herein.

The number of radio frames that fail to be acquired is appropriately estimated.

What is claimed is:

1. An apparatus comprising:
a memory storing instructions; and
one or more processors configured to execute the instructions to:
for each of a plurality of radio channels of a radio facility, acquire a plurality of radio frames transmitted and received through the radio channel as captured by a capture apparatus configured to operate in a monitor mode;
for each radio channel, specify key frames, based on time information of the plurality of acquired radio frames;
for each radio channel, calculate a sum of time lengths of at least a part of the plurality of radio frames being located between two adjacent ones of the key frames;
for each radio channel, estimate a number of unacquired radio frames, based on the specified key frames and the calculated sum, the unacquired radio frames being radio frames that have failed to been acquired;
for each radio channel, calculate a channel use rate based on the acquired radio frames that have been captured and based on the unacquired radio frames that have been estimated;
select, from the plurality of radio channels, a radio channel to use within the radio facility based on the channel use rate that has been calculated for each radio channel; and
transmit and receive subsequent radio frames within the radio facility through the radio channel that has been selected.

2. The apparatus according to claim 1, wherein the one or more processors are configured to execute the instructions to, when a difference of time information between two of the plurality of radio frames being adjacent with respect to time exceeds a threshold, specify a latter one of the two of the plurality of radio frames as one of the key frames.

3. The apparatus according to claim 1, wherein the one or more processors are configured to execute the instructions to estimate the number of unacquired radio frames, based on comparison results obtained by comparing a difference of the time information between the two adjacent ones of the key frames and the sum.

4. The apparatus according to claim 1, wherein the one or more processors are configured to execute the instructions to calculate a sum of time lengths of data frames located between the two adjacent ones of the key frames as the sum of the time lengths of the at least the part of the plurality of radio frames being located between the two adjacent ones of the key frames.

5. The apparatus according to claim 4, wherein the number of unacquired radio frames estimated by the one or more processors is a number of ACK frames transmitted as a response for the data frames.

6. The apparatus according to claim 1, wherein the one or more processors are configured to execute the instructions to estimate that the number of unacquired radio frames is equal to a number of the data frames being located between the two adjacent ones of the key frames.

7. The apparatus according to claim 1, wherein one or more processors are configured to execute the instructions to provide a radio frame set combining the plurality of radio frames acquired in multiple acquisition processing performed by the one or more processors.

8. The apparatus according to claim 1, wherein the one or more processors are configured to execute the instructions to calculate the sum of the time lengths of the plurality of radio frames, based on a number of bits of the plurality of radio frames and a frame transmission rate, or by measuring occupancy time of the radio channel.

9. The apparatus according to claim 1, wherein the one or more processors are configured to execute the instructions to estimate the number of unacquired radio frames, based on an aggregation state estimated according to the specified key frames and the calculated sum.

10. An estimation method comprising:
  for each of a plurality of radio channels of a radio facility, acquiring a plurality of radio frames transmitted and received through the radio channel as captured by a capture apparatus configured to operate in a monitor mode;
  for each radio channel, specifying key frames, based on time information of the plurality of acquired radio frames;
  for each radio channel, calculating a sum of time lengths of at least a part of the plurality of radio frames being located between two adjacent ones of the key frames;
  for each radio channel, estimating a number of unacquired radio frames, based on the specified key frames and the calculated sum, the unacquired radio frames being radio frames that have failed to been acquired;
  for each radio channel, calculating a channel use rate based on the acquired radio frames that have been captured and based on the unacquired radio frames that have been estimated;
  selecting, from the plurality of radio channels, a radio channel to use within the radio facility based on the channel use rate that has been calculated for each radio channel; and
  transmitting and receiving subsequent radio frames within the radio facility through the radio channel that has been selected.

11. A non-transitory computer-readable recording medium having recorded thereon a program causing a computer to execute:
  for each of a plurality of radio channels of a radio facility, acquiring a plurality of radio frames transmitted and received through the radio channel as captured by a capture apparatus configured to operate in a monitor mode;
  for each radio channel, specifying key frames, based on time information of the plurality of acquired radio frames;
  for each radio channel, calculating a sum of time lengths of at least a part of the plurality of radio frames being located between two adjacent ones of the key frames;
  for each radio channel, estimating a number of unacquired radio frames, based on the specified key frames and the calculated sum, the unacquired radio frames being radio frames that have failed to been acquired;
  for each radio channel, calculating a channel use rate based on the acquired radio frames that have been captured and based on the unacquired radio frames that have been estimated;
  selecting, from the plurality of radio channels, a radio channel to use within the radio facility based on the channel use rate that has been calculated for each radio channel; and
  transmitting and receiving subsequent radio frames within the radio facility through the radio channel that has been selected.

* * * * *